(12) United States Patent
Freson et al.

(10) Patent No.: US 7,614,527 B2
(45) Date of Patent: Nov. 10, 2009

(54) VALVE AND SUPPLYING DEVICE FOR FILLING A MOLDING CAVITY WITH A POLYMERIZABLE MATERIAL

(75) Inventors: David Freson, Estrees-Deniecourt (FR); Jean-François Cailloux, Bussy Saint Georges (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 585 days.

(21) Appl. No.: 10/556,050

(22) PCT Filed: Jun. 10, 2004

(86) PCT No.: PCT/FR2004/001452

§ 371 (c)(1),
(2), (4) Date: Dec. 4, 2006

(87) PCT Pub. No.: WO2004/110732

PCT Pub. Date: Dec. 23, 2004

(65) Prior Publication Data

US 2007/0102459 A1    May 10, 2007

(30) Foreign Application Priority Data

Jun. 11, 2003 (FR) .................................. 03 06990

(51) Int. Cl.
*B67D 5/40* (2006.01)
(52) U.S. Cl. .............................. 222/380; 222/1; 222/266
(58) Field of Classification Search ...................... 222/1, 222/380, 402.1, 596, 262, 263, 309, 333–335, 222/266, 286, 295, 310, 476, 318, 340, 402.16, 222/424, 52, 61
See application file for complete search history.

(56) References Cited

U.S. PATENT DOCUMENTS

| | | | | |
|---|---|---|---|---|
| 3,622,050 A | * | 11/1971 | Acton et al. ................. | 222/309 |
| 3,979,021 A | * | 9/1976 | Reinecke ....................... | 222/1 |
| 3,982,663 A | * | 9/1976 | Larkin ........................... | 222/1 |
| 4,116,364 A | * | 9/1978 | Culbertson et al. ............ | 222/40 |
| 4,251,474 A | | 2/1981 | Blandin | |
| 4,374,531 A | | 2/1983 | Heinzl et al. | |
| 4,821,927 A | * | 4/1989 | Paulsen et al. ............... | 222/263 |
| 4,971,012 A | * | 11/1990 | Brunnel et al. .............. | 123/450 |
| 5,350,084 A | * | 9/1994 | Miller et al. ................. | 222/137 |
| 5,842,611 A | * | 12/1998 | Vivier ......................... | 222/256 |
| 6,969,248 B1 | | 11/2005 | Huard et al. | |
| 2002/0185865 A1 | | 12/2002 | Hagmann et al. | |

FOREIGN PATENT DOCUMENTS

| | | |
|---|---|---|
| EP | 0 473 546 | 3/1992 |
| FR | 2 792 243 | 10/2000 |

* cited by examiner

*Primary Examiner*—Lien T Ngo
(74) *Attorney, Agent, or Firm*—Young & Thompson

(57) ABSTRACT

The inventive valve comprises a dosing chamber (20) connected to a dispenser (16) provided with input and output orifices (7, 8) which are connected to said dosing chamber (20) when the dispenser (16) is in a position (21), an injection orifice (9) being isolated. When the dispenser (16) is in a position (23), the input and output orifices (7,8) are isolated from the dosing chamber (20) and from an injection orifice (9) which are connected to each other. In addition, said device comprises a source of polymerisable material which is provided with a container (5), a continuous pump (6) and a control unit (3) for control elements (19, 24) of the valve (2).

16 Claims, 3 Drawing Sheets

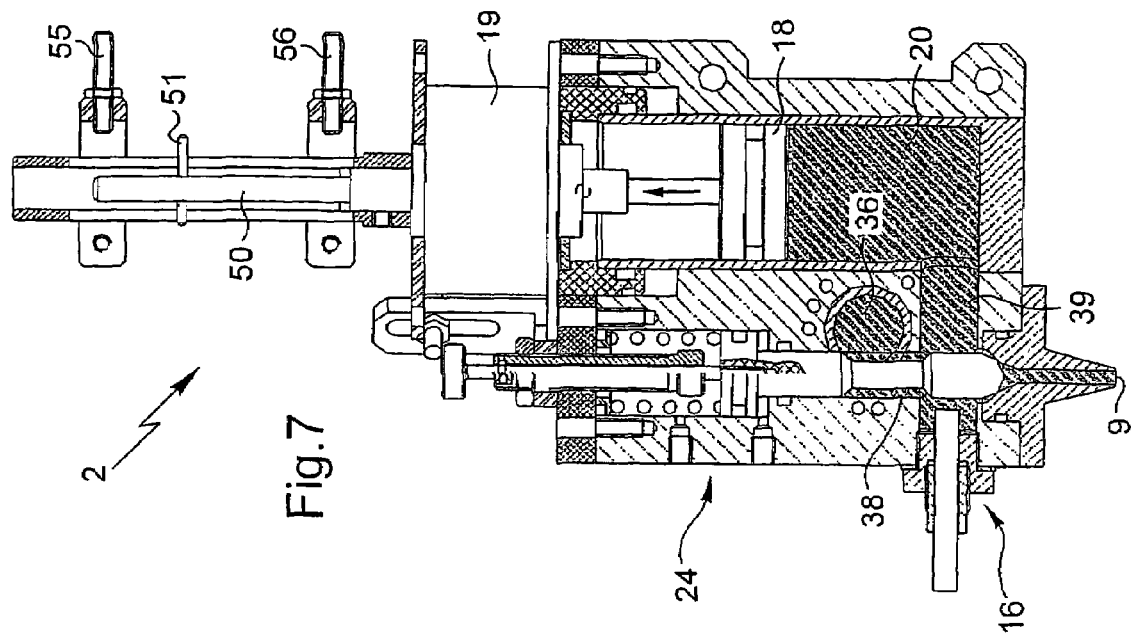
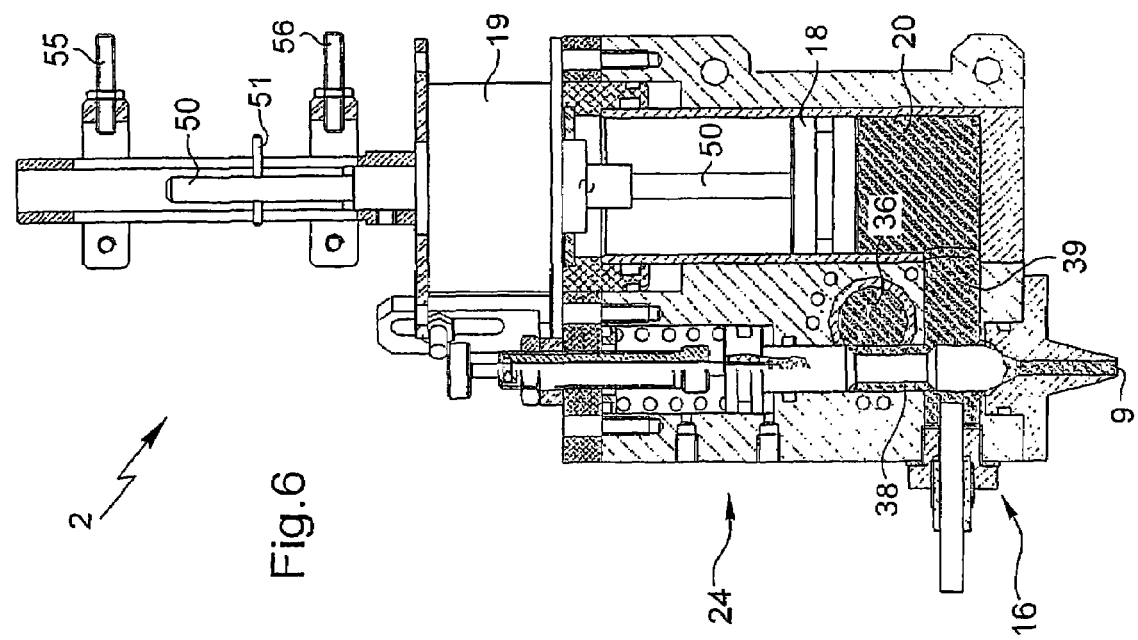

VALVE AND SUPPLYING DEVICE FOR FILLING A MOLDING CAVITY WITH A POLYMERIZABLE MATERIAL

The invention relates generally to supplying devices for filling with a polymerizable material a molding cavity for molding an optical lens, especially an ophthalmic lens.

There is already known in the art, from French patent application 2 792 243, to which corresponds U.S. Pat. No. 6,969,248, a valve for this kind of supplying device which includes a channel discharging at one end through an ejection orifice and having a lateral inlet orifice and a lateral outlet orifice respectively adapted to the arrival and the evacuation of the molding material, this valve also including a plunger that is mounted in the channel so that it is mobile in translation. In a rest position of the plunger, the inlet orifice and the outlet orifice are in communication and the ejection orifice is isolated both from the inlet orifice and from the outlet orifice. In a working position of the plunger, in which the molding cavity is supplied, the inlet orifice is in communication with the ejection orifice and the outlet orifice is isolated from the inlet orifice and from the ejection orifice.

To prevent the deposition of a film of material inside the valve (this phenomenon is known as valve fouling or gumming) and also to prevent the spontaneous formation of bubbles (this phenomenon is known as "bubbling"), when the plunger is in the rest position, the molding material arriving at the valve continues to flow, being evacuated from the valve via the outlet orifice, instead of stagnating in the valve.

The invention aims to improve this type of valve, and more generally the device for supplying the molding cavity of which this valve is part.

To this end it proposes a valve suitable for filling, with a polymerizable material, a cavity for molding an optical lens, especially an ophthalmic lens, which valve includes a material inlet orifice, a material outlet orifice, an orifice for ejecting material into said cavity, and a distributor for putting into communication with each other or isolating from each other the material inlet orifice, the material outlet orifice and the ejection orifice; the valve is characterized in that:

it includes a dosing chamber connected to said distributor, a mobile piston whose position fixes the volume of said dosing chamber, means for controlling the position of said mobile piston, and means for controlling the position of said distributor;

the inlet orifice and the outlet orifice are in permanent communication; and said distributor has a first position in which said material inlet orifice and said material outlet orifice are in communication with said dosing chamber and in which said ejection orifice is isolated from said material inlet orifice, from said material outlet orifice and from the dosing chamber, and has a second position in which said material inlet orifice and said material outlet orifice are isolated both from the dosing chamber and from the ejection orifice and in which the dosing chamber and the ejection orifice are in communication with each other.

In the first position of the distributor, the dosing chamber is in communication with the material inlet orifice and with the material outlet orifice, between which there is a flow of polymerizable molding material.

If the mobile piston is then moved in the direction that increases the dosing chamber volume, the latter fills with polymerizable material, the transfer between the region of flow of this material and the dosing chamber occurring exclusively inside the valve. The ejection orifice being isolated, there is no discharge of polymerizable material through this orifice.

In the second position of the distributor, the inlet orifice and the outlet orifice are connected exclusively to each other and the dosing chamber and the ejection orifice are connected exclusively to each other.

If the dosing chamber and the connection between the latter and the ejection orifice are then filled with polymerizable material, moving the mobile piston in the direction that decreases the volume of the dosing chamber has the effect of causing the expulsion, via the ejection orifice, of a quantity of polymerizable material whose volume is exactly equal to the variation of the volume of the dosing chamber.

It is clear that the valve of the invention decouples the flow of the polymerizable material inside the valve from the expulsion of that material via the ejection orifice.

Thanks to this decoupling, it is possible to expel the polymerizable material via the ejection orifice under conditions of flowrate and volume that may be set with great accuracy, in this instance by the amplitude and speed of the movement of the mobile piston.

It is further possible to maintain a continuous flow of the polymerizable material, including during filling of the dosing chamber, provided that the rate at which the volume of this chamber increases remains less than the flowrate of the flow of the material in the supply circuit, which helps to prevent the phenomena of valve gumming and bubbling in the supply circuit.

As for the valve proper, the same phenomena can be prevented by choosing an appropriate value for the flowrate and effecting temperature regulation, as explained hereinafter.

According to preferred features of the valve of the invention, said distributor has a third position in which said material inlet orifice, said material outlet orifice, the dosing chamber and the ejection orifice are all in communication with each other.

This position has the advantage of allowing at least partial purging of the valve, especially of its portion situated between the material inlet orifice and the material ejection orifice.

Said third position is preferably an intermediate position that said distributor assumes when it moves from the first position to the second position and vice-versa.

Thus the valve is partially purged on each change from the first position to the third position and on each change from the third position to the first position.

According to features of the valve that are preferred for reasons of simplicity and convenience:

it includes a first channel whereof a first end forms said inlet orifice and a second end forms said outlet orifice, a second channel discharging at a first end via said ejection orifice and communicating at a second end with said first channel via a transfer orifice, a third channel whereof a first end discharges into said second channel and a second end discharges into said dosing chamber at an end opposite said piston, and a dispensing finger slidably mobile in said second channel; and, where applicable said finger is adapted to cooperate with a lateral wall of said second channel to assume a first position in which it abuts against a seat, thereby isolating said third channel from a first portion of said second channel situated between said seat and said ejection orifice, and in which it allows said third channel to communicate with said first channel via a second portion of said second channel and to assume a second position in which it isolates said third channel from said second portion of the second channel and allows said third channel to communicate with said first portion of the second channel.

According to other features that are preferred for the same reasons:

said means for controlling the distributor are pneumatic means; and, where applicable said means for controlling said distributor include a rod having a dispensing finger at a first end and a piston forming part of a pneumatic piston-and-cylinder at a second end; and, where applicable said valve includes an adjustable position abutment member for said piston.

According to further features that are preferred for the same reasons:

said member for controlling the position of said piston mobile in the dosing chamber includes an electromechanical stepper system; and, where applicable said valve includes a rod passing through said electromechanical stepper system and to a first end whereof said mobile piston is fixed; and, where applicable said valve includes at least one sensor for sensing the position of said rod; and, where applicable said valve includes two sensors for sensing the position of said rod, respectively a sensor for sensing an end of stroke position in which said mobile piston delimits a maximum volume of said dosing chamber and a second end of stroke position in which said mobile piston delimits a minimum volume of said dosing chamber.

According to other features that are preferred as being favorable to the occurrence of defects caused by valve gumming or syrup effects, the valve includes channels for circulating thermal regulation liquid.

A second aspect of the invention provides a supplying device suitable for filling with a polymerizable material a cavity for molding an optical lens, especially an ophthalmic lens, including a valve according to the invention, a unit for controlling the control means of the distributor and the control means of the mobile piston, and a supply of polymerizable material including a tank of polymerizable material and a continuous circulation pump, a material inlet orifice of the valve being connected to a discharge orifice of the pump, a material outlet orifice of the valve being connected to a return orifice of the tank, and an outlet orifice of the tank being connected to a suction orifice of the pump.

According to features that are preferred by reason of the quality of the results obtained, said control unit is adapted, starting from a rest position of said valve in which said distributor is in said first position and in which said dosing chamber has a predetermined volume and is filled with polymerizable material:

operating on said means for controlling the distributor to move it to its second position; then operating on said means for controlling the position of said mobile piston to move said piston a predetermined distance in the direction that reduces the volume of said dosing chamber; then operating on said means for controlling the distributor to move it into said first position; and operating on said means for controlling the position of said mobile piston to move the latter in the direction that increases the volume of said dosing chamber until that chamber assumes said predetermined volume.

For reasons of simplicity and convenience of implementation, said predetermined volume of said dosing chamber in said rest position is preferably its maximum volume.

The description of the invention continues next with the following description of one embodiment of the invention, which is given by way of illustrative and nonlimiting example and with reference to the appended drawings. In the latter:

FIGS. 4 to 7 are views similar to FIG. 2 showing successive operating positions of this valve.

Figure 1:
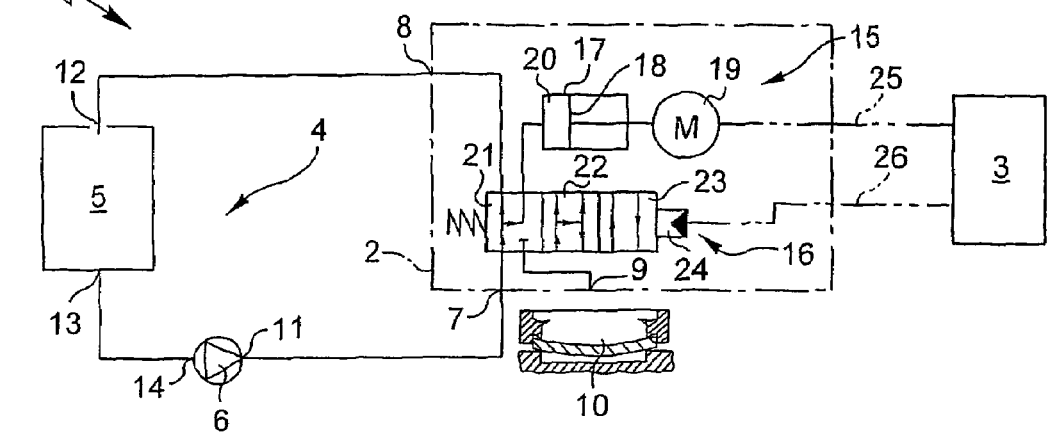
FIG. 1 is a diagram showing a supplying device according to the invention and the molding cavity to be filled.

The supplying device 1 represented in FIG. 1 includes a valve 2, a control unit 3 and a supply 4 of polymerizable material including a tank 5 of polymerizable material and a pump 6 for continuously circulating the polymerizable material.

The valve 2 has a polymerizable material inlet orifice 7, a polymerizable material outlet orifice 8 and an orifice 9 for ejecting polymerizable material into the molding cavity 10.

The orifice 7 is connected by a pipe to a discharge orifice 11 of the pump 6, the orifice 8 is connected by a pipe to a return orifice 12 of the tank 5 and the outlet orifice 13 of the tank 5 is connected to a suction orifice 14 of the pump 6.

The valve 2 includes a dosing piston-and-cylinder 15 and a distributor 16.

The dosing piston-and-cylinder 15 includes a cylinder 17, a piston 18 mobile in the cylinder 17 and means 19 for controlling the position of the piston 18.

The cylinder 17 and the piston 18 conjointly delimit a dosing chamber 20, whose volume is fixed by the position of the piston 18 in the cylinder 17.

The distributor 16 includes a plunger able to assume three positions 21, 22 and 23 and means 24 for controlling the position assumed by the distributor, to be more precise by the plunger of the latter.

The distributor 16 is connected to the orifices 7, 8 and 9 and to the dosing chamber 20. The control means 19 and 24 for the dosing piston-and-cylinder 15 and the distributor 16, respectively, are connected to the control unit 3, in this example by an electrical connection 25 (the means 19 include an electric stepper motor) and by a pneumatic pipe 26 (the control unit 24 includes a single-acting pneumatic piston-and-cylinder), respectively.

In FIG. 1, the distributor 16 is in the position 21, which is its rest position. In this position, the orifices 7 and 8 and the dosing chamber 20 are in communication with each other whereas the orifice 9 is isolated from the orifice 7, the orifice 8 and the chamber 20.

In the position 23, which is the working position of the distributor 16, the orifices 7 and 8 are in communication with each other and isolated from the dosing chamber 20 and from the orifice 9 and the dosing chamber 20 and the orifice 9 are in communication with each other.

In the position 22, which is an intermediate position, the orifice 7, the orifice 8, the orifice 9 and the chamber 20 are all connected to each other.

It will be noted that in each of the positions 21, 22 and 23 of the distributor 16 the inlet orifice 7 and the outlet orifice 8 are in communication. More generally, in the valve 2, the orifices 7 and 8 are in continuous communication so that the polymerizable liquid circulated continuously by the pump 6 can flow continuously from the orifice 7 to the orifice 8.

The operation of the supplying device 1 is explained next.

At rest, the distributor 16 is in the position 21 and the dosing chamber 20 has its maximum volume and is filled with polymerizable molding material.

To expel a predetermined volume of polymerizable material into the molding cavity 10, the control unit 3 operates on the means 24 so as to place the distributor 16 in the position 23, so that the chamber 20 is placed in communication with the orifice 9 and the chamber 20 and the orifice 9 are isolated from the orifices 7 and 8.

The control unit 3 then operates on the control means 19 to move the piston 18 in the direction that reduces the volume of the chamber 20, so that the polymerizable material is ejected via the orifice 9 and fills the cavity 10, which takes the form of a cup disposed under the orifice 9, as will be explained in more detail hereinafter.

When the piston 18 has moved the required distance, i.e. when the required quantity of polymerizable material has been expelled into the cup 10, the control unit 3 operates on the means 19 to stop the movement of the piston 18 and then operates on the means 24 to move the distributor 19 to the position 21. The configuration is then that shown in FIG. 1.

The unit 3 then operates on the means 19 to move the piston 18 in the direction that increases the volume of the chamber 20, until the latter chamber reaches its maximum volume.

This re-establishes the initial rest position.

The speed of movement of the piston 18 in the direction that increases the volume of the chamber 20 is chosen so that the rate at which the volume of this chamber varies remains less than or equal to the discharge flowrate of the pump 6 so that the chamber 20 is filled under the best conditions.

When the distributor 16 moves from the rest position 21 to the working position 23, it is briefly in the intermediate position 22. In this position, the orifice 9 is in communication with the orifice 7 in particular. This has the effect of expelling a small amount of polymerizable material via the orifice 9, for example an amount of the order of a few drops.

Of course, what has just been said for the movement from the position 21 to the position 23 is equally valid for the movement from the position 23 to the position 21.

The expulsion of a small amount of polymerizable material in the intermediate position 22 offers the advantage of enabling partial purging of the circuit internal to the valve 2 situated between the orifices 7 and 9.

The molding cavity 10 is described in more detail next, with reference to FIG. 2, which shows this cavity filled with a predetermined quantity 27 of polymerizable material.

The cavity 10 is formed by a shell 28 for molding an ophthalmic lens (here a spectacle lens) and an annular seal 29, as described in particular in French patent 2 449 519, to which corresponds U.S. Pat. No. 4,251,474.

The overall shape of the shell 28 is that of a cup. The seal 29 has an internally projecting bead 30 having on one side a lip 31 and on the other side a lip 32.

To form the cavity 10, the shell 28 rests on a support 33 and the seal 29, the inside diameter whereof corresponds to the outside diameter of the shell 28, is fitted over the latter with the lip 32 cooperating with the shell 28 to provide a seal, the concave face of the latter facing upward and forming the bottom of the cup, the lateral walls of the latter being formed by the seal 29.

After filling the cavity 10 with the predetermined quantity 27 of polymerizable material, a second molding shell is placed in the seal 29 so that it provides a seal with the lip 31. The quantity 27 of liquid expelled into the cavity 10 is then disposed between the shell 28 and the other shell. The polymerization of this quantity 27 of material may then begin, at the end of which the mold formed by the shell 28, the seal 29 and the other shell contains an ophthalmic lens that it remains only to remove from the mold by removing the seal 29 and unsticking the shells.

One embodiment of the valve 2 is described next with reference to FIGS. 3 to 7.

In this embodiment, the valve 2 includes a main body 35 in which is provided a conduit 36 whose ends respectively form the inlet orifice 7 and the outlet orifice 8 (not visible in FIGS. 3 to 7).

A nozzle 37 whose free end forms the polymerizable material ejection orifice 9 is fixed to the body 35.

A channel 38 formed in the body 35 and in the nozzle 37 discharges at one end via the orifice 9 and the other end the channel 38 is in communication with the channel 36, here via a transfer orifice 36' situated in the lateral wall of the channel 36.

The cylinder 17 in which the piston 18 is received is disposed in a bore in the body 35.

A channel 39 is formed in the body 35 and the cylinder 17 between the end of the latter opposite the piston 18 and the channel 38.

A dispensing finger 40 is disposed in the channel 38. The finger 40 is mobile therein, sliding between a position shown in FIGS. 3, 6 and 7 and the position shown in FIGS. 4 and 5.

Figure 3:
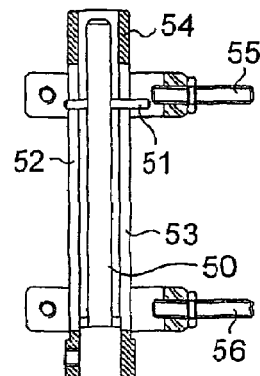
FIG. 3 is an elevation view in section of the valve shown diagrammatically in FIG. 1.
Figure 3:
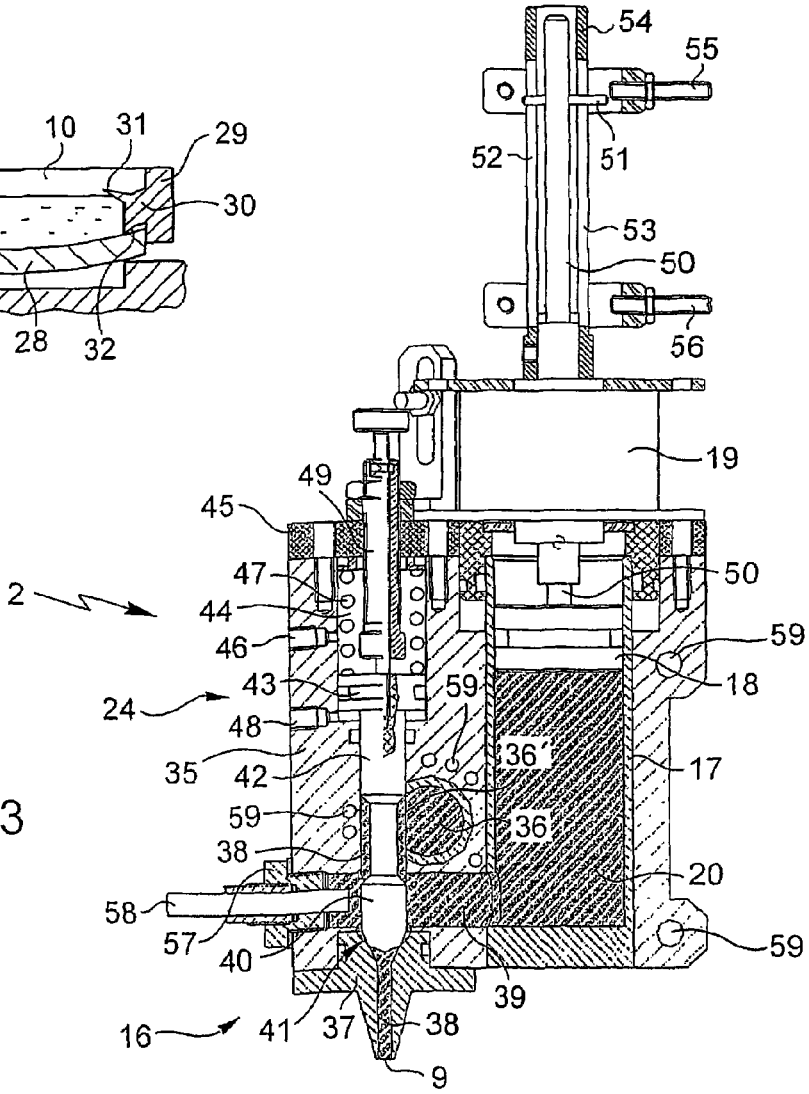

In the position shown in FIGS. 3, 6 and 7 the finger 40 isolates the channel 39 from the portion of the channel 38 formed in the nozzle 37 but allows the channel 39 to communicate with the portion of the channel 38 situated between the channel 36 and the channel 39. This corresponds to the position 21 of the distributor 16 shown diagrammatically in FIG. 1.

Figure 4:
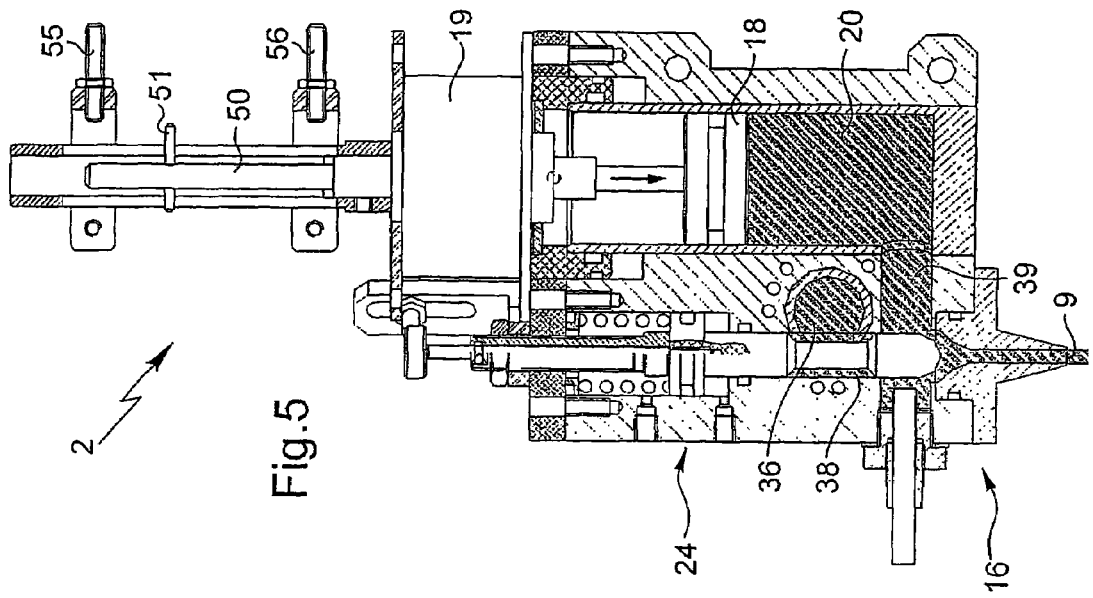
Figure 5:
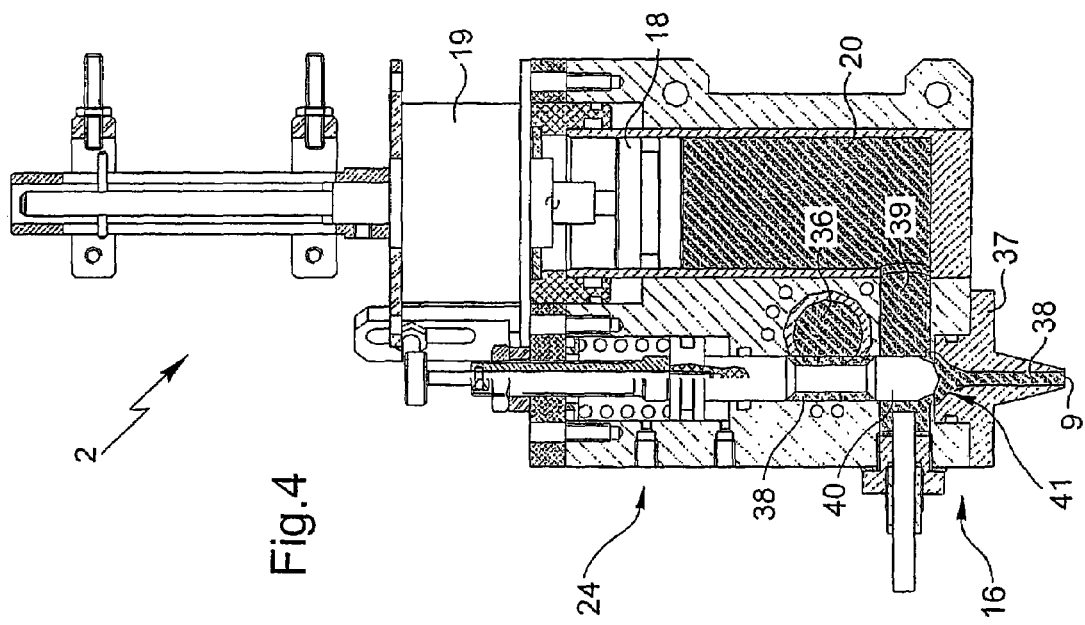

In the position shown in FIGS. 4 and 5, the channel 39 is in communication with the portion of the channel 38 situated in the nozzle 37 and the channel 39 is isolated from the portion of the channel 38 situated between the channel 36 and the channel 39. This corresponds to the position 23 shown diagrammatically in FIG. 1.

When the finger 40 is in an intermediate position between the position shown in FIGS. 3, 6 and 7 and the position shown in FIGS. 4 and 5, the channel 39 communicates with the whole of the channel 38. This corresponds to the position 22 shown diagrammatically in FIG. 1.

To enable the finger 40 to isolate from the channel 39 the portion of the channel 38 situated in the nozzle 37, the latter has a seat 41 against which the free end of the finger 40 abuts to effect closure, as shown in FIGS. 3, 6 and 7.

The channel 39 is isolated from the portion of the channel 38 situated between the channel 36 and the channel 39 by virtue of the sealing cooperation of the lateral wall of this portion of the channel 38 and the lateral wall of the finger 40, as shown in FIGS. 4 and 5.

The finger 40 is situated at one end of a rod 42 whose other end forms a piston 43 mobile in a bore 44 of the body 35 closed by a cap 45. The chamber that constitutes the portion of the bore 44 situated between the piston 43 and the cap 45 is vented to the atmosphere via a lateral orifice 46. A return spring 47 in this chamber urges the piston 43 in the direction in which the finger 40 abuts against the seat 41.

The other chamber, situated between the bottom of the bore 44 and the piston 43, is connected to the pneumatic conduit 27 by a lateral orifice 48. To set the stroke of the piston 43, and thus of the finger 40, a rod 49 whose lateral wall is screwthreaded projects into the bore 44 from the cap 45 to form at its end a stop abutment for the piston 43 (see FIGS. 4 and 5).

The lateral screwthread of the rod 49, which cooperates with a screwthread of the cap 45, enables the position of the finger 49 in the bore 44 to be adjusted.

It is seen that at rest (with the conduit 26, connected to the orifice 48, vented to the atmosphere), the spring 47 urges the piston 43 toward the position in which the finger 40 abuts against the seat 41 whereas, when the conduit 26 is pressurized, the piston 43 abuts against the rod 49.

The piston 18 disposed in the cylinder 17 is fixed to the end of a rod 50 passing through an electromechanical stepper system 19 that controls the position of the piston 18.

The rod 50 has on its lateral wall a screwthread cooperating with a nut driven by the electric motor of the system 19 so that there is a predetermined fixed ratio between the rotation of the motor of the system 19 and the sliding movement of the piston 18.

To prevent the rod 50 rotating, the latter includes a transverse pin 51 that passes through two opposite elongate openings 52 and 53 in the tube 54 surrounding the portion of the rod 50 situated at the opposite end from the piston 18. On the tube 54 are mounted position sensors 55 and 56 for sensing the presence of the pin 51. When the pin 51 is opposite the sensor 55, which is that farthest from the motor 19, as shown in FIGS. 3 and 4, the volume of the dosing chamber 20 is at its maximum, and when the pin 51 is opposite the sensor 56, which is that closest to the motor 19, the volume of the dosing chamber 2 is at its minimum.

It will be noted that the channel 39 includes, in addition to its portion extending between the channel 38 and the chamber 20, another portion at its opposite end and extending the first portion of the channel 39. This other portion is closed by a stopper 57 at the center of which is a sensor 58 for sensing the temperature of the polymerizable material inside the valve 2.

To regulate the temperature of the various regions containing polymerizable material (the chamber 20 and the channels 36, 38 and 39), the body 35 includes two channels 59 for circulating a thermal liquid.

Temperature regulation helps to prevent defects caused by the valve gumming effect and the syrup effect.

Moreover, an appropriate choice of the rate at which the polymerizable material flows prevents bubbling phenomena.

As indicated above, the configuration shown in FIG. 3 is the rest configuration of the valve 2.

When, starting from this position, the pneumatic conduit 26 is pressurized by the unit 3, the piston 43 abuts against the end of the rod 49, as shown in FIG. 4 (this corresponds to the position 23).

Retaining this position of the finger 40, the unit 3 operates on the motor of the stepper system 19 to command displacement of the piston 18 in the direction that reduces the volume of the chamber 20. Polymerizable material then flows out of the ejection orifice 9, as shown in FIG. 5.

When the piston 18 has been displaced by the amount required for the required volume to have been expelled through the orifice 9, the unit 3 vents the conduit 26 to the atmosphere, so that the spring 47 causes the finger 40 to abut against the seat 41. The position is then that shown in FIGS. 1 and 6.

To re-establish the rest position, the unit 3 acts on the motor of the system 19 to return the piston 18 to its initial position, as shown in FIG. 7.

Figure 2:
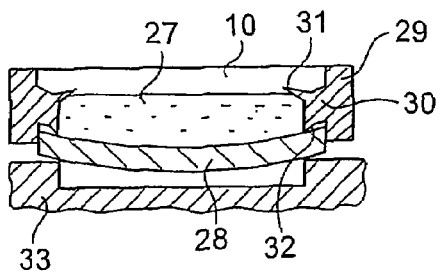
FIG. 2 shows the filled molding cavity to a larger scale.

In a variant that is not shown, the valve 2 is employed with an arrangement different from that shown in FIGS. 3 to 7, in particular by having the seat 41 form part of a member other than the nozzle 37 and making the control piston-and-cylinder of the piston 40 a double-acting piston-and-cylinder with a safety spring, rather than a single-acting piston-and-cylinder, and/or the filled cavity is different from the cavity 10 shown in FIGS. 1 and 2.

More generally, it should be remembered that the invention is not limited to the embodiments described and shown.

The invention claimed is:

1. Valve suitable for filling, with a polymerizable material, a cavity (10) for molding an optical lens, especially an ophthalmic lens, which valve (2) includes a material inlet orifice (7), a material outlet orifice (8), an orifice (9) for ejecting material into said cavity (10), and a distributor (16) for putting into communication with each other or isolating from each other the material inlet orifice (7), the material outlet orifice (8) and the ejection orifice (9), which valve is characterized in that:

it includes a dosing chamber (20) connected to said distributor (16), a mobile piston (18) whose position fixes the volume of said dosing chamber (20), means (19) for controlling the position of said mobile piston (18), and means (24) for controlling the position of said distributor (16);

the inlet orifice (7) and the outlet orifice (8) are in permanent communication; and said distributor (16) has a first position (21) in which said material inlet orifice (7) and said material outlet orifice (8) are in communication with said dosing chamber (20) and in which said ejection orifice (9) is isolated from said material inlet orifice (7), from said material outlet orifice (8) and from the dosing chamber (20), and has a second position (23) in which said material inlet orifice (7) and said material outlet orifice (8) are isolated both from the dosing chamber (20) and from the ejection orifice (9) and in which the dosing chamber (20) and the ejection orifice (9) are in communication with each other.

2. Valve according to claim 1, characterized in that said distributor (16) has a third position (22) in which said material inlet orifice (7), said material outlet orifice (8), the dosing chamber (20) and the ejection orifice (9) are all in communication with each other.

3. Valve according to claim 2, characterized in that said third position (22) is an intermediate position that said distributor (16) assumes when it moves from the first position (21) to the second position (23) and vice-versa.

4. Valve according to claim 1, characterized in that it includes a first channel (36) whereof a first end forms said inlet orifice (7) and a second end forms said outlet orifice (8), a second channel (38) discharging at a first end via said ejection orifice (9) and communicating at a second end with said first channel (36) via a transfer orifice (36'), a third channel (39) whereof a first end discharges into said second channel (38) and a second end discharges into said dosing chamber (20) at an end opposite said piston (18), and a dispensing finger (40) slidably mobile in said second channel (38).

5. Valve according to claim 4, characterized in that said finger (40) is adapted to cooperate with a lateral wall of said second channel (38) to assume a first position, in which it abuts against a seat (41), thereby isolating said third channel (39) from a first portion of said second channel (38) situated between said seat (41) and said ejection orifice (9), and in which it allows said third channel (39) to communicate with said first channel (36) via a second portion of said second channel (38), and to assume a second position, in which it isolates said third channel (39) from said second portion of the second channel (38) and allows said third channel (39) to communicate with said first portion of the second channel (38).

6. Valve according to claim 1, characterized in that said means (24) for controlling the distributor (16) are pneumatic means.

7. Valve according to claim 6, characterized in that said means (24) for controlling said distributor (16) includes a rod

(42) having a dispensing finger (40) at a first end and a piston (43) forming part of a pneumatic piston-and-cylinder at a second end.

8. Valve according to claim 7, characterized in that it includes an adjustable position abutment member (49) for said piston (43).

9. Valve according to claim 1, characterized in that said member (19) for controlling the position of said piston (18) mobile in the dosing chamber (20) includes an electromechanical stepper system (19).

10. Valve according to claim 9, characterized in that it includes a rod (50) passing through said electromechanical stepper system (19) and to a first end whereof said mobile piston (18) is fixed.

11. Valve according to claim 10, characterized in that it includes at least one sensor (55, 56) for sensing the position of said rod (50).

12. Valve according to claim 11, characterized in that it includes two sensors for sensing the position of said rod (50), respectively a sensor for sensing an end of stroke position in which said mobile piston (18) delimits a maximum volume of said dosing chamber (20) and a second end of stroke position in which said mobile piston delimits a minimum volume of said dosing chamber (20).

13. Valve according to claim 1, characterized in that it includes channels (59) for circulating thermal regulation liquid.

14. Supplying device suitable for filling with a polymerizable material a cavity (10) for molding an optical lens, especially an ophthalmic lens, including a valve (2) according to claim 1, a unit (3) for controlling the control means (24) of the distributor (16) and the control means (19) of the mobile piston (18), and a supply (5, 6) of polymerizable material including a tank (5) of polymerizable material and a continuous circulation pump (6), the material inlet orifice (7) of the valve (2) being connected to a discharge orifice (11) of the pump, a material outlet orifice (8) of the valve (2) being connected to a return orifice (12) of the tank (5), and an outlet orifice (13) of the tank being connected to a suction orifice of the pump.

15. Device according to claim 14, characterized in that said control unit (3) is adapted, starting from a rest position of said valve (2) in which said distributor (16) is in said first position (21) and in which said dosing chamber (20) has a predetermined volume and is filled with polymerizable material:

operating on said means (24) for controlling the distributor (16) to move it to its second position (23); then operating on said means (19) for controlling the position of said mobile piston (18) to move said piston a predetermined distance in the direction that reduces the volume of said dosing chamber; then operating on said means (24) for controlling the distributor (16) to move it into said first position (21); and operating on said means (19) for controlling the position of said mobile piston (18) to move the latter in the direction that increases the volume of said dosing chamber (20) until that chamber assumes said predetermined volume.

16. Device according to claim 15, characterized in that said predetermined volume of said dosing chamber (20) in said rest position is its maximum volume.

* * * * *

UNITED STATES PATENT AND TRADEMARK OFFICE
CERTIFICATE OF CORRECTION

PATENT NO.        : 7,614,527 B2                                              Page 1 of 1
APPLICATION NO.   : 10/556050
DATED             : November 10, 2009
INVENTOR(S)       : Freson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 645 days.

Signed and Sealed this

Nineteenth Day of October, 2010

David J. Kappos
*Director of the United States Patent and Trademark Office*